US011405267B2

(12) United States Patent
Tseng et al.

(10) Patent No.: US 11,405,267 B2
(45) Date of Patent: Aug. 2, 2022

(54) POLICY-BASED TEMPORAL DOMAIN CONFIGURATION ARCHITECTURE

(71) Applicant: HEWLETT PACKARD ENTERPRISE DEVELOPMENT LP, Houston, TX (US)

(72) Inventors: Yung-Ching Tseng, Palo Alto, CA (US); Jian-Feng Guo, Liaoning (CN); Ying Guo, ChongQing (CN); Xiang Guan, ChongQing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 403 days.

(21) Appl. No.: 16/249,087

(22) Filed: Jan. 16, 2019

(65) Prior Publication Data
US 2020/0228399 A1 Jul. 16, 2020

(51) Int. Cl.
| H04L 12/24 | (2006.01) |
| G06Q 30/06 | (2012.01) |
| H04L 41/0803 | (2022.01) |
| H04L 41/0893 | (2022.01) |
| H04L 41/0866 | (2022.01) |

(52) U.S. Cl.
CPC ..... *H04L 41/0803* (2013.01); *G06Q 30/0613* (2013.01); *H04L 41/0866* (2013.01); *H04L 41/0893* (2013.01)

(58) Field of Classification Search
None
See application file for complete search history.

(56) References Cited

U.S. PATENT DOCUMENTS

| 8,503,336 B2 | 8/2013 | Rappaport et al. |
| 8,855,003 B2 | 10/2014 | Bajpay et al. |
| 9,306,806 B1 | 4/2016 | Zhang |
| 9,454,294 B2 | 9/2016 | Sapuram et al. |

(Continued)

FOREIGN PATENT DOCUMENTS

CN 105791011 7/2016

OTHER PUBLICATIONS

Break Vendor Lock-in Using White Box Management, (White Paper), 2017, Retrieved Sep. 17, 2018, 7 Pgs.

(Continued)

*Primary Examiner* — Kevin T Bates
*Assistant Examiner* — Emad Siddiqi
(74) *Attorney, Agent, or Firm* — Nolte Intellectual Property Law Group

(57) ABSTRACT

Systems and methods address automated temporally based configuration management of a procurement/deployment process that may be used at one or more data centers. A set of current configuration attributes and current parameter settings are maintained for a one or more data centers. Information may be obtained from a purchasing system describing a future device. Prior to actual arrival of the future device, the configuration for that future device may be defined. Upon detection of the uniquely identified future device being communicatively coupled to a management network, the previously defined configuration may be applied. Abstraction from a high-level to vendor specific configuration commands may also be incorporated to allow management of devices from multiple vendors.

20 Claims, 11 Drawing Sheets

(56) References Cited

U.S. PATENT DOCUMENTS

| | | |
|---|---|---|
| 9,882,969 B2 | 1/2018 | Reddy et al. |
| 10,313,479 B2 | 6/2019 | Lochhead et al. |
| 10,419,285 B2 | 9/2019 | Messinger et al. |
| 10,516,734 B2 | 12/2019 | Malachowski et al. |
| 11,004,110 B2 | 5/2021 | Mouline et al. |
| 2005/0021723 A1* | 1/2005 | Saperia ................ H04L 41/022 709/223 |
| 2010/0042834 A1* | 2/2010 | Moret ................ H04L 41/0806 713/168 |
| 2014/0279808 A1 | 9/2014 | Strassner |
| 2016/0301570 A1* | 10/2016 | Meyer ................ H04L 67/303 |
| 2017/0366404 A1* | 12/2017 | Levy ................ H04L 41/0893 |
| 2020/0104401 A1 | 4/2020 | Burnett et al. |

OTHER PUBLICATIONS

Jackson, J., Redfish Spec Wiggles Servers Free From Vendor Lock-in, (Web Page), Oct. 6, 2014, 3 Pgs.

Shivaji, S., Simplifying Data Center Network Management Leveraging SDN, (White Paper), Mar. 2014, 16 Pgs.

SysKit Monitor, (Web Page), Retrieved Sep. 7, 2018, 2 Pgs.

* cited by examiner

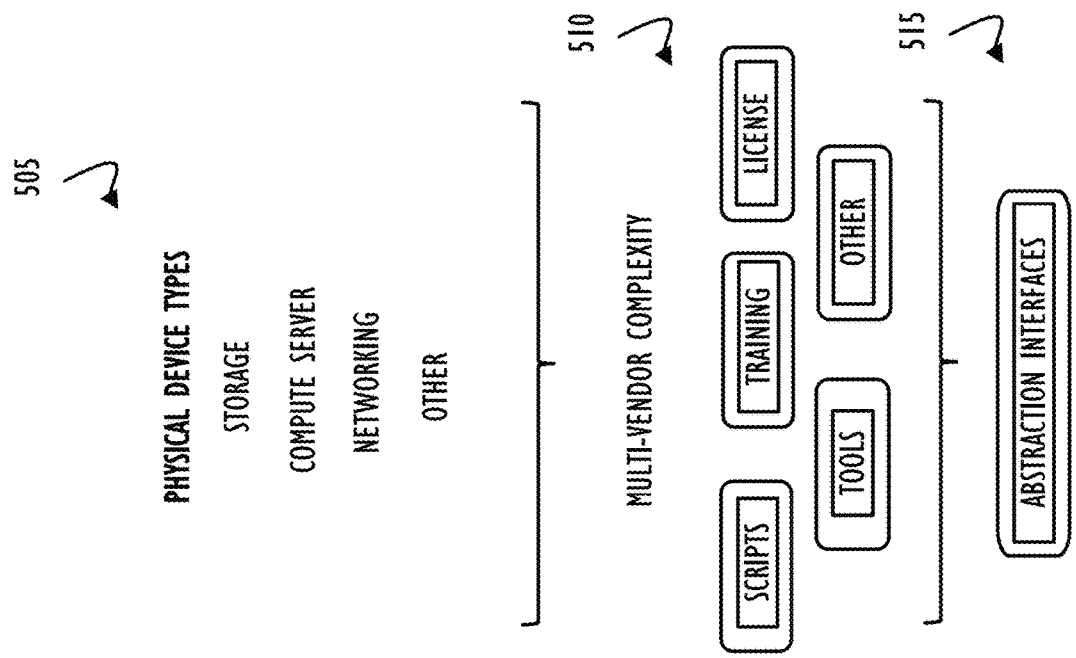

POLICY-BASED TEMPORAL DOMAIN CONFIGURATION ARCHITECTURE

BACKGROUND

Networks of computers that support business activities are often composed of a multitude of infrastructure devices (e.g., computational, storage, and network resources). These infrastructure devices may provide, for example, a cohesive system of coordinated computing devices that support many automated functions for a corporate enterprise. In some cases, these computing devices are staged at one or more data centers and multiple data centers may work together to provide redundancy for each other and offer load balancing for automated computational tasks. Maintenance of multiple data centers, to provide reliable service to both internal and external customers, may include systems to plan and coordinate growth, availability, and capacity of data centers, both individually and as a whole (e.g., comprehensive corporate infrastructure network).

Capacity planning represents a function to measure existing devices relative to their performance metrics with respect to servicing existing computational tasks and to forecast increases in capability to meet future needs. The overall procurement and installation of new capacity may be a time-consuming process and may be referred to as a procurement/deployment process. The procurement/deployment process may not only be time-consuming but may also involve controlled checkpoints to validate accuracy of intended upgrades. This validation may include at least two points of validation. Firstly, that the upgrade provides the intended capacity increase, and, secondly that the upgrade does not introduce any unforeseen errors into an already functioning system. The coordination of implementation of changes in a corporate computer network is sometimes referred to as "change management" or "change request management" (CM or CRM respectively). A subpart of CM/CRM is often controlled using a configuration management system (CMS) to schedule and coordinate system availability. The procurement of new devices (e.g., capacity in general) may be controlled through a purchasing system that is likely independent of the CMS (and CM/CRM processes).

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not perform serial processing and therefore those functions may be performed in an order different than shown or possibly in parallel with each other. For a detailed description of various examples, reference will now be made to the accompanying drawings, in which:

FIG. 5A illustrates possible physical device types, that may be provided by different vendors and may exist concurrently in a data center, along with an abstraction model to reduce multi-vendor complexity, according to one or more disclosed implementations;

DETAILED DESCRIPTION

Figure 1:
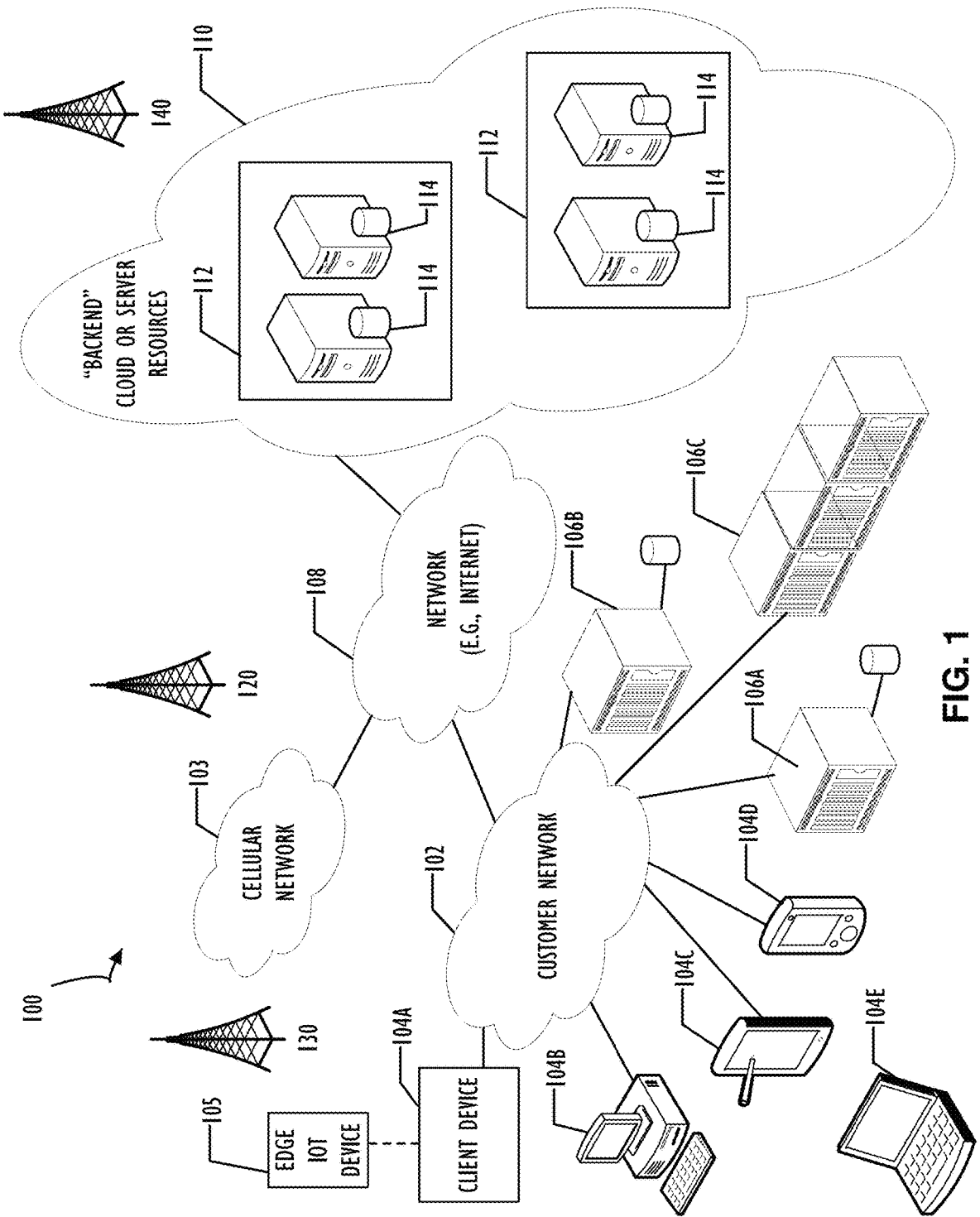
FIG. 1 illustrates a functional block diagram of a system including multiple networks and devices that may benefit from the concepts of this disclosure, including an example data center as a portion of "backed" server resources, according to one or more disclosed implementations.

Illustrative examples of the subject matter claimed below will now be disclosed. In the interest of clarity, not all features of an actual implementation are described for every example implementation in this disclosure. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

A CMS system may be used as part of the above-mentioned change management for a corporate infrastructure of devices (e.g., a corporate network) and generally controls configuration changes in a production data center environment. There are many aspects with respect to configuration management and potentially different automated tools to manage each of these different aspects. Configuration management, in this context, refers to managing software, hardware, and network communication components of one or more computer data centers. Managing changes to configurations is one goal of configuration management. Changes are typically planned, scheduled, tested, deployed, and maintained as versions of alterations for audit tracking and error recovery/diagnosis (e.g., allow for roll-back of a change if something unexpected occurs). These types of activities are generally managed by change requests. A change request relates to a unit of work to implement a change (e.g., a configuration change) on a computer system, system of computers, or network, etc. Sometimes one change request will be broken down into a set of smaller related change requests. Overall, the planning and coordinating of change requests for an enterprise may represent a significant responsibility and may be highly impactful to an organization if not performed properly. Accordingly, system administrators and organizations, as a whole, may rely heavily on automated change request tracking systems and related systems (e.g., capacity planning systems, purchasing systems, deployment managers, help desk systems, event management and alert systems, etc.).

As used herein, references to the corporate or infrastructure network are not intended to include only network devices, and these references, in this disclosure, are intended to include devices (e.g., computer devices such as servers, user stations, storage, etc.) that are connected to the actual network. That is, reference to a network device used to support network traffic (e.g., router, bridge, etc.) is an example of a device that is, for this disclosure, considered as a part of an infrastructure network. Any reference directed specifically to the network (e.g., communications infrastructure) or to a network device (as opposed to a network attached device) will be made clear by the context of that reference.

Generally, each of the systems used by a corporate enterprise to participate in an infrastructure network may have their own proprietary interfaces at the component level (e.g., automated configuration interfaces, automated monitoring interfaces) and at the user level (e.g., proprietary independent user interfaces) where there may be a web-based or graphical user interface (GUI) presentation method. Other presentation methods are also possible but are becoming less common as web-based interfaces grow in popularity. Managing a large set of computational devices having non-uniform component hardware, divergent software installations, and networking components from different vendors represents a complicating factor for most system administrators. Accordingly, it would be desirable to provide a command level interface that integrates multiple lower level tools and alleviates the interaction with multiple different interfaces (e.g., different vendor interfaces) when performing change management tasks. Also, most change request systems do not include support for hypothetical or future configurations. That is, current change request systems may be configured to only interact with actual live hardware and software components. Disclosed improvements to the art of system administration include at least a common higher-level abstracted interface for a system administrator and introduction of a temporal nature to configuration management. Disclosed improvements may further include a policy-based temporal (e.g., time aware) domain (e.g., subset of enterprise network) architecture for performing change management and implementing sets of related change events (i.e., acting on a change request) throughout one or more data centers. That is, disclosed improvements assist in providing a system to implement changes in a coordinated fashion throughout all affected infrastructure of an organization.

In some implementations, disclosed improvements provide an abstraction layer at different interface points, as necessary, throughout different systems and components that may be managed in a comprehensive manner. For example, a vendor abstraction layer may be provided to convert configuration command parameters from a common format (e.g., high-level format such as natural language) into proprietary formats for hardware components from different vendors.

In one example, suppose that there are three switches, one from each of vendor A, vendor B, and vendor C. It is expected that each switch will understand routing table updates but may have different command functions, different arguments (e.g., command options or values), or different argument ordering. The following is an example of a command to define a new network route. Specifically, the vendor A switch might expect something like "route define 128.100.99.11 127.100.99.88-day 1" to define a route from network address 128.100.99.11 to network address 127.100.99.88 for a 24-hour time period (or till midnight of today). To implement this same configuration change, the vendor B switch might expect "define route -d 1 128.100.99.11 127.100.99.88" where -d 1 relates to -day 1 of the previous example and "define route" is different than "route define." Still further, the vendor C switch might expect "route define 128.100.99 127.100.99.88" and have no concept of a "day" parameter. Thus, for the vendor C switch, a corresponding "route delete" function may additionally be scheduled for midnight as a separate command invocation. As a result, the same functionality may be imparted to each switch using slightly different interface instructions which, in accordance with disclosed implementations, may be translated from a higher-level abstracted interface automatically. In one implementation, a higher-level interface may communicate a command to a vendor abstraction layer for each vendor (i.e., A, B, and C) and the abstraction layer, specific to the appropriate vendor, would take care of providing the lower level command directly to the vendor's device. For example, a higher-level command may simply be "route network address 128.100.99 to network address 127.100.99.88 for today." This example is artificial to some extent but used here to illustrate the concept of different levels of abstraction at both the user interface level and as translated by different vendor abstraction layers.

Additionally, disclosed implementations may include a temporal capability that may represent yet a separate improvement for system administrators and the technical art of system administration. Traditional processes are serialized within an organization in that a new device is expected be physically present at the purchaser site prior to implementing any of that specific device's configuration. In disclosed example implementations, a command level interface may additionally interface with a purchasing system to understand when a purchase order (PO) has been placed and when that PO may be expected to be fulfilled. At some point in the life cycle of a PO, after it is placed with a vendor for example, a communication of expected hardware components may be made available to the purchasing system. Specifically, the purchasing system may be informed (e.g., by a vendor system) that an order for two Linux servers is expected to be filled within the next two weeks and the serial numbers for each of these two Linux servers will be #####1 and #####2. Further, the bill of materials (BOM) may have information (or the purchase order might) about specific hardware and software components available on each of the Linux servers. Clearly, components of server #####1 may be different than those of #####2 (or they may be identical). In one proposed implementation in accordance with disclosed techniques, the command level system may be interfaced with a sister purchasing system to automatically receive procurement information including specifications and timing. Thus, a system administrator may be able to assign a policy to a specific server prior to its actual arrival at a data center.

Using the actual vendor serial number of the server may provide a high degree of certainty that the components will match what is expected when it arrives. Accordingly, having the previously defined policy, a server may be automatically configured (e.g., via automatic application of change requests) once that server is recognized on the network (or authorized for deployment). In either case, once the system is recognized on the network, an informational message may be displayed via a command console interface to inform a system administrator that the "new" system is installed and communicating on the network. Historically, this type of interaction caused delays, in part, because the installer would have to interact with the system administrators to inform the system administrators that a new system had been installed. In general, previous systems and manual methods of deployment may include several interface points where installation and deployment time-to-use was increased over the time-to-use that may be realized utilizing the disclosed command level system.

The following phases may be representative of phases that may be applied to each new component addition at a data center (or enterprise system). Each of these phases may be controlled at that phase level by a specifically tailored automated process (e.g., a specialized automated system that is separated for each functional timeline presented). Interfacing information from each of these phases automatically at a command console level may reduce errors, increase transparency, and provide enhanced productivity for an organization (among other benefits).

Overall, the process of bringing new components online at a data center may include a procurement phase and a deployment phase that may each have a corresponding timeline. For example, a procurement timeline may include: a server purchasing decision; a network purchasing decision; a storage purchasing decision; a network configuration and authorization requirements definition/implementation; hardware assembly; and hardware installation including positioning, cabling, and racking. After completion of the procurement timeline, a deployment timeline may be initiated and include: data center device configuration (e.g., change requests to allow existing infrastructure to interact with new system(s)); new component software configurations; dry-run testing prior to production availability; and cut-over to production (e.g., go live of new components). Disclosed implementations attempt to compress and parallelize these timelines and may also include additional automated tasks to ensure proper availability of new components within a given data center.

Component types within a data center may include any type of device that may participate in supporting an enterprise network. In general, component device types may be broken down into at least two high level classes of Hardware and Software. Hardware may include, but not be limited to: Storage Devices; Network Communication Devices (e.g., switches, routers, bridges); and Compute Resources (e.g., cloud-based virtual servers, physical servers, redundant server pairs, architecture equivalent resource pools, servers with specialized capabilities (matrix manipulation, highly parallel systems, IO intensive systems), rack systems)). Software may include, but not be limited to: Application licensed resources; Distributed Application resources; and Heightened Security compliant systems.

Having an understanding of the above overview, this disclosure now explains at least one non-limiting example implementation (and possible variants thereof). This example implementation is explained with reference to the figures that include: a functional block diagram of system including multiple networks and devices that may benefit from the concepts of this disclosure, including an example data center as a portion of "backed" server resources (FIG. 1); a block diagram representing an example data center and multiple devices, as example devices, that may exist in a data center and be managed using the concepts of this disclosure (FIG. 2); a flow chart depicting a "serial" method of actions that may be performed as part of a procurement/deployment process and a second flow chart illustrating examples of potential parallelization to reduce an overall timeline for the procurement/deployment process (FIG. 3); a functional block diagram illustrating inputs to (and processing of) a management station that may be used to improve a procurement/deployment process (FIG. 4); possible physical device types, that may be provided by different vendors and concurrently exist in a data center, along with an abstraction model to reduce multi-vendor complexity (FIG. 5A); an example timeline for planning and deployment of data center devices (FIG. 5B); one example technique for abstraction and temporal awareness with respect to a procurement/deployment process (FIG. 6); an example domain of devices that may exist in a data center and their potential interface to a management station system to improve a procurement/deployment process (FIG. 7); one example method for automating and improving system administrator interactions with respect to a procurement/deployment system (FIG. 8); and an example computing device instrumented with computer instructions to perform the method of FIG. 8 (FIG. 9); and a computing device that may be used to implement the functions, modules, processing platforms, execution platforms, communication devices, and other methods and processes of this disclosure is illustrated in FIG. 10.

Referring now to FIG. 1, a computer network infrastructure 100 is illustrated. Computer network infrastructure 100 may be used to implement all or part of the disclosed technique for a temporally aware procurement and deployment system, according to one or more disclosed examples. Network infrastructure 100 includes a set of networks where embodiments of the present disclosure may operate and be utilized. Network infrastructure 100 comprises a customer network 102, network 108 (e.g., the Internet), cellular network 103, and a cloud service provider network 110. In one embodiment, the customer network 102 may be a local private network, such as local area network (LAN) that includes a variety of network devices that include, but are not limited to switches, servers, and routers.

Each of these networks may contain wired or wireless programmable devices and operate using any number of network protocols (e.g., TCP/IP) and connection technologies (e.g., WiFi® networks, or Bluetooth®. In another example, customer network 102 represents an enterprise network that could include or be communicatively coupled to one or more local area networks (LANs), virtual networks, data centers (see FIG. 2) and/or other remote networks (e.g., 108, 110). In the context of the present disclosure, customer network 102 may include a network device supporting a change management system such as that described above. Additionally, customer network 102 may represent a target network supported by disclosed implementations of a policy-based temporally aware domain architecture for change management.

As shown in FIG. 1, customer network 102 may be connected to one or more client devices 104A-E and allow the client devices 104A-E to communicate with each other and/or with cloud service provider network 110, via network 108 (e.g., Internet). Client devices 104A-E may be computing systems such as desktop computer 104B, tablet computer 104C, mobile phone 104D, laptop computer (shown as wireless) 104E, and/or other types of computing systems generically shown as client device 104A.

Network infrastructure 100 may also include other types of devices generally referred to as Internet of Things (IoT) (e.g., edge IoT device 105) that may be configured to send and receive information via a network to access cloud computing services or interact with a remote web browser application (e.g., to receive configuration information).

FIG. 1 also illustrates that customer network 102 includes local compute resources 106A-C that may include a server, access point, router, or other device configured to provide for local computational resources and/or facilitate communication amongst networks and devices. For example, local compute resources 106A-C may be one or more physical local hardware devices. Local compute resources 106A-C may also facilitate communication between other external applications, data sources (e.g., 101A and 101B), and services, and customer network 102.

Network infrastructure 100 also includes cellular network 103 for use with mobile communication devices. Mobile cellular networks support mobile phones and many other types of mobile devices such as laptops etc. Mobile devices in network infrastructure 100 are illustrated as mobile phone 104D, laptop computer 104E, and tablet computer 104C. A mobile device such as mobile phone 104D may interact with one or more mobile provider networks as the mobile device moves, typically interacting with a plurality of mobile network towers 120, 130, and 140 for connecting to the cellular network 103.

FIG. 1 illustrates that customer network 102 is coupled to a network 108. Network 108 may include one or more computing networks available today, such as other LANs, wide area networks (WAN), the Internet, and/or other remote networks, in order to transfer data between client devices 104A-D and cloud service provider network 110. Each of the computing networks within network 108 may contain wired and/or wireless programmable devices that operate in the electrical and/or optical domain.

In FIG. 1, cloud service provider network 110 is illustrated as a remote network (e.g., a cloud network) that is able to communicate with client devices 104A-E via customer network 102 and network 108. The cloud service provider network 110 may act as a platform that provides additional computing resources to the client devices 104A-E and/or customer network 102. In one embodiment, cloud service provider network 110 includes one or more data centers 112 with one or more server instances 114. Cloud service provider network 110 may also include one or more frames representing a scalable compute resource that may benefit from the techniques of this disclosure. Each of the disclosed networks may include one or more data centers (not specifically illustrated) that may benefit from disclosed techniques for policy-based temporally aware change management.

Figure 2:
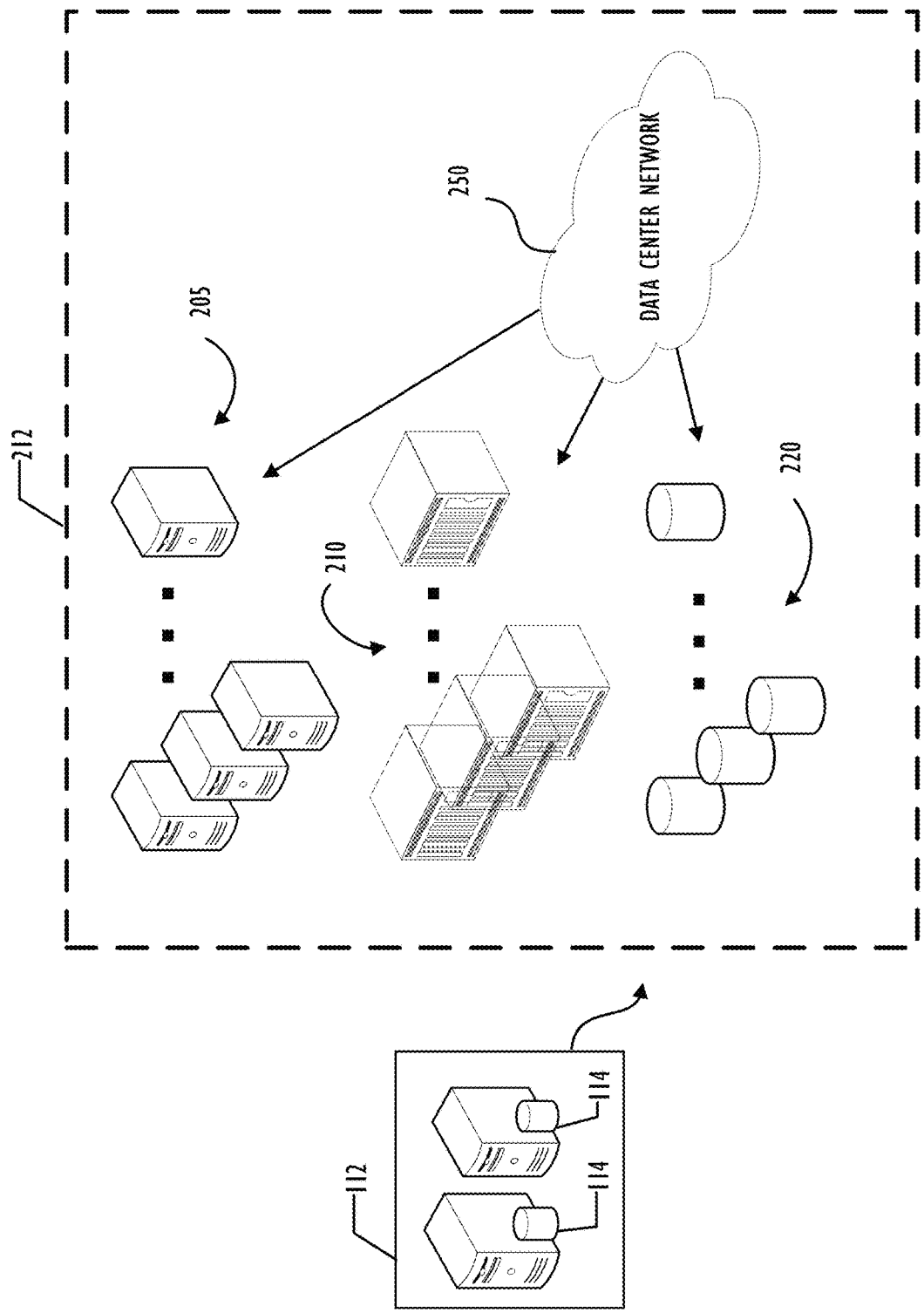
FIG. 2 illustrates a block diagram representing an example data center including multiple devices, as example devices, that may exist in a data center and be managed using the concepts of this disclosure, according to one or more disclosed implementations.

Referring to FIG. 2, a block diagram illustrates an example data center 212, as shown as an expansion of a portion of cloud resources from FIG. 1. Data center 212 includes multiple devices, as example devices, that may exist in a data center and be managed using the concepts of this disclosure. As illustrated, data center 212 includes multiple servers 205 that may provide compute resources (i.e., perform computations) for a corporate network. There may be many servers 205 in a single data center that may work together or work with other servers in other data centers (not shown). Also illustrated in data center 212, multiple network communication devices 210 may be used to facilitate communication between data centers and within a data center. For example, network communication devices 210 may support a data center network 250 and connections between data centers, that may be dedicated links, and/or connections to external networks such as those shown in FIG. 1. Finally, data center 212, in this simplified example, includes storage devices 220 that may be network attached (e.g., via data center network 250) or directly connected to one or more of servers via a communication bus (not shown).

Data center 212 may include additional devices (e.g., switches, routers, mainframes, clusters, cables, power supplies, wireless access points, etc.) not shown in FIG. 2 and there may be many devices within one data center. In some cases, storage devices 220 and compute resources such as servers 205 may be rack mounted and, rather than trouble shoot an individual device, an entire rack may be replaced (e.g., using a fork lift) to reduce impact on the data center. To be clear, the scale of devices in FIG. 2 is greatly simplified and there may be thousands of devices of different types from different manufacturers within a single data center. Thus, using the fork lift method, a data center operator may be able to maintain their operational capability and defer single device maintenance to an area that is not an active part of the data center. Specifically, when a device within a rack fails, the other devices in that rack are not discarded but simply moved (e.g., using a forklift) out of production so that they can be repaired "off-line." Then, upon repair, the entire rack of devices may be brought back to active use. Of course, if the data center grows its overall capacity a purchase of new equipment may be initiated and utilize the concepts of this disclosure to make those new devices available as part of the production network.

Figure 3:
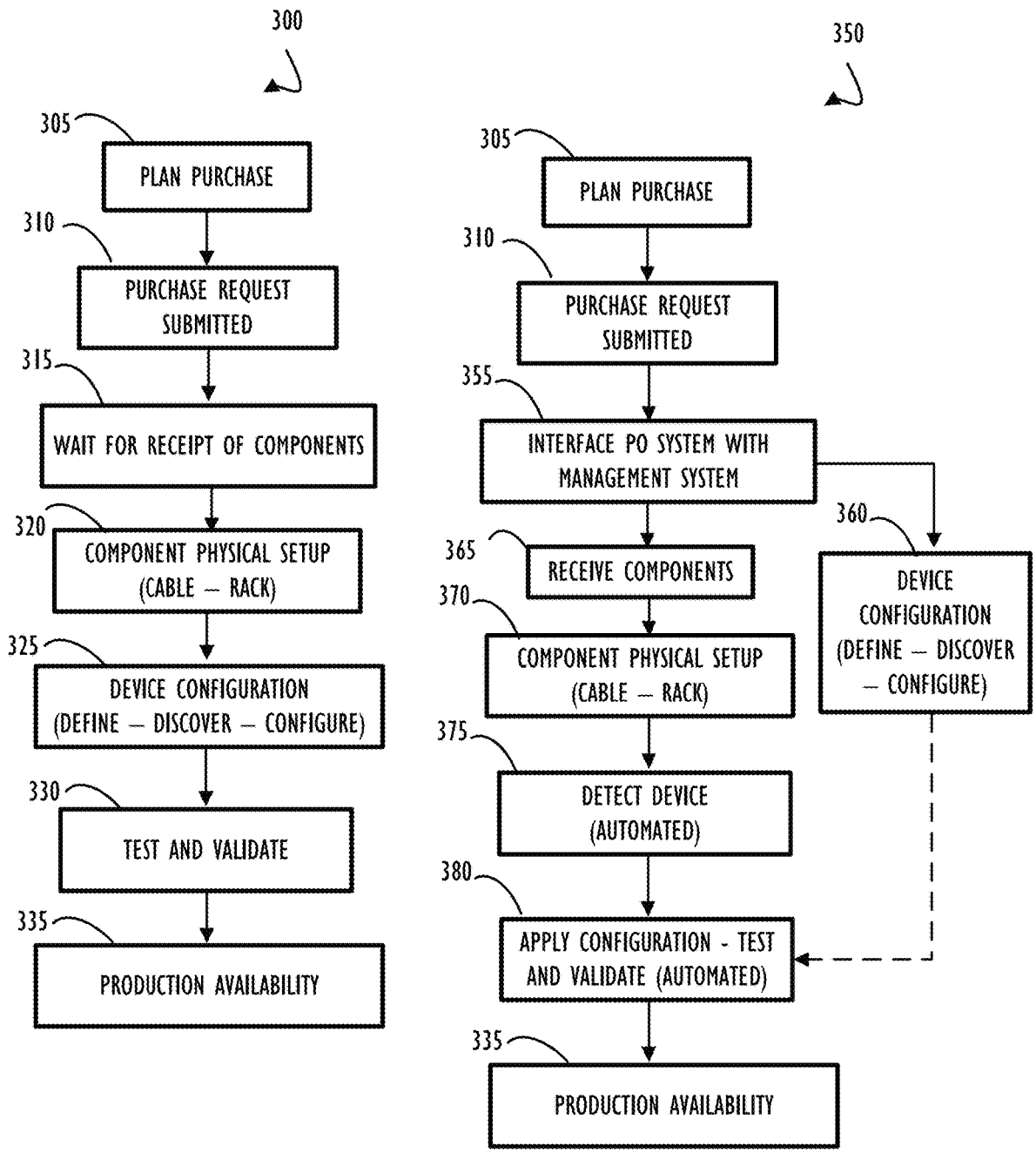
FIG. 3 illustrates a flow chart depicting a "serial" listing of activities that may be performed as part of a procurement/deployment process and a second flow chart illustrating examples of possible parallelization to reduce an overall timeline for the procurement/deployment process, according to one or more disclosed implementations.

Referring now to FIG. 3, two related flow charts are illustrated. A first flow chart depicting a "serial" method 300 outlines (at a high level) actions that may be performed as part of a procurement/deployment process. A second flow chart depicting method 350, illustrates examples of potential parallelization to reduce an overall timeline for the procurement/deployment process.

In the example of FIG. 3, method 300 begins with a plan to purchase new equipment as illustrated by block 305. Note, that a procurement/deployment process may also be used to replace a failed device. However, for simplicity, this example describes a procurement/deployment process for new equipment. Once the planning phase has completed, flow may continue to block 310 where a purchase request (e.g., a PO) may be submitted. For example, the purchase request in the form of a purchase order may be entered into a computer system and that computer system may interact with a vendor computer system to place the order for actual equipment. Block 315 indicates that method 300 waits for actual devices to arrive at the data center in response to the purchase request being fulfilled. After arrival of the new equipment, block 320 indicates that components may be physically set up by installing racks, connecting cables, and the like. Block 325 indicates that a device configuration may be applied to the newly set up devices. For example, any configurations desired by the purchaser that are different than factory default settings may be applied. Block 330 indicates that new equipment may then be tested and validated to ensure compliance with configuration requirements of the organization (e.g., security settings). Finally, method 300 ends with the newly purchased equipment being made available in a production environment as illustrated at block 335. Of course, other steps and actions may exist in an actual procurement/deployment process and those steps/actions may differ from one organization (or data center) to another.

Continuing with FIG. 3, example method 350 illustrates similar steps to those of method 300 and indicates potential points of automation and parallelization for the steps/actions of a procurement/deployment process, in accordance with the concepts of this disclosure. As in method 300, the example procurement/deployment method 350 begins at block 305 and progresses to block 310 where a purchase request has been initiated. Block 355 indicates that an interface may be provided, for example between a purchasing system and a management system, to initiate a monitoring activity to further automate and enhance the procurement/deployment process. As indicated at block 360, device configuration may begin as soon as a purchase request is submitted and may continue throughout the timeline to production availability. Initially, the PO may include information about what was ordered, and a system administrator may apply a base configuration using just this high-level configuration information about what is "expected" to be delivered. As the purchasing process matures, a vendor system may provide information about what is being shipped responsive to the purchase request. This information (e.g., at shipping time or there about) may include information to uniquely identify specific components or devices that are expected to arrive. For example, the serial number of a server may be made available as explained above.

Block 365 indicates that components from the purchase request are received. Block 370 indicates that the newly arrived components may be physically assembled and connected to a network (e.g. a configuration network as opposed to a production network if desired). Block 375 indicates that the newly arrived components may be automatically detected, and their identification may be correlated to a previously defined configuration (i.e., the configuration associated with the new devices serial number from block 360). Having a previously defined configuration, flow continues to block 380 where that configuration (which may have been set up prior to actual arrival of these specific components) may be automatically applied and validated. Finally, in a similar manner to method 300, method 350 ends at block 335 where the newly purchased equipment being made available in a production environment.

Figure 4:
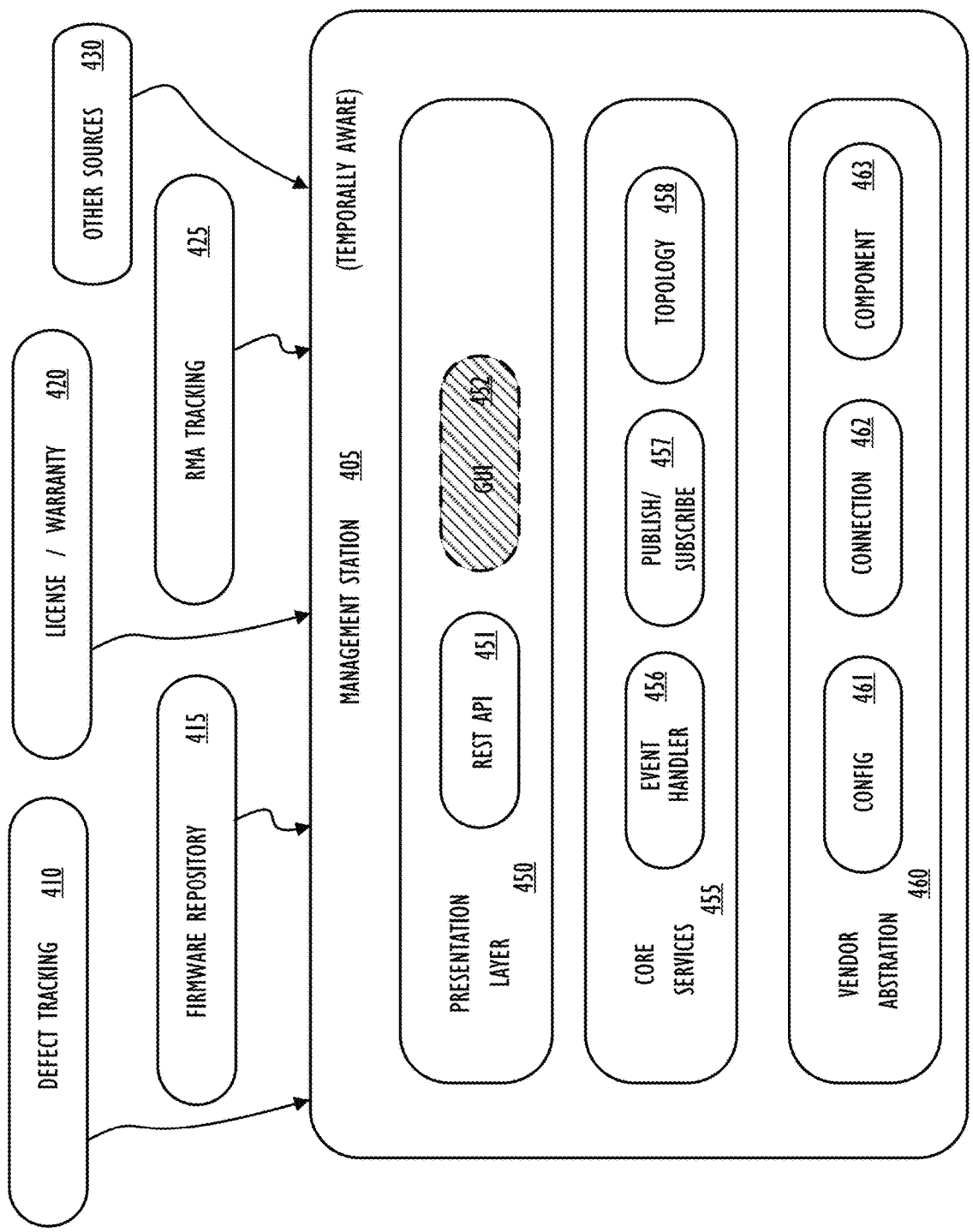
FIG. 4 illustrates a functional block diagram illustrating inputs to (and processing of) a management station that may be used to improve a procurement/deployment process, according to one or more disclosed implementations.

Referring to FIG. 4, a functional block diagram is depicted to illustrate example inputs to (and processing of) a management station 405 that may be used to improve a procurement/deployment process in accordance with the concepts of this disclosure. As illustrated and described above, management station 405 may be temporally aware in that it can manage devices that are not "yet" physically present in a data center. Management station 405 also includes a vendor abstraction layer 460 that, as mentioned above, may abstract commands so that high-level configuration commands may be translated into vendor specific commands for different devices within the data center (or data centers) being managed. Block 410 indicates that a defect tracking system may provide inputs to management station 405. Block 415 indicates that a firmware repository, for example containing different versions of firmware releases for different hardware components, may be interfaced with management system 405. Block 420 indicates that license and warranty information may also be made available (or integrated with) management station 405. Block 425 indicates that return merchandise authorization (RMA) may also be made available to management station 405 as well as other sources of information as indicated by block 430. In short, management station 405 may integrate or interface with information for complete life cycle management of data center resources. In contrast to prior solutions, management station 405 as disclosed includes additional sources of information not typically available to a data center management system (e.g., a CMS).

Having an understanding of sources of available information as described above, management station 405 further illustrates potential internal functional blocks to provide the disclosed overall functionality of a temporally aware policy-based domain architecture. Specifically, in this example, there is a presentation layer 450, a core services layer 455, and a vendor abstraction layer 460. Included in the presentation layer 450, there may be a REST API (REpresentational STate Application Program Interface) which may be used to provide a web services interface to management station 405, for example. Presentation layer 450 is also illustrated to include a Graphical User Interface (GUI) 452. GUI 452 is illustrated as a "dotted line" component to indicate that a GUI may be "projected" to any number of devices including the device executing the management station 405 functionality or a remote device. Although not shown, a command line interface (CLI) may also be provided by some implementations of management station 405. The core services layer 455, in this example, includes an event handler 456, a publish/subscribe interface 457, and a topology module 458. The event handler may receive and process (or even initiate) events to cause actions within an infrastructure network. The publish/subscribe interface 457 may work in concert with a web services interface to provide information to and from management station 405. Topology module 458 may be part of a discovery of devices capability and understand network architecture to aid in automated deployment of components and assist in making components available to a production network, for example. Finally, this example includes vendor abstraction 460 that incorporates config 461, connection 462, and component information 463. That is, vendor abstraction 460 may have capability to interact directly with end devices to configure them, determine connectivity status and requirements, and perform overall component level actions (e.g., configuration commands and run-time actions). Thus, management station 405 may represent a high-level interface to allow a system administrator to have a single point for which to enter commands (e.g., high-level configuration commands that may be in a natural language format) that will be translated automatically and applied using vendor specific command invocations at the component level (e.g., using vendor dependent commands).

Referring to FIG. 5A, different physical device (including different types of devices), that may be provided by multiple distinct vendors and exist concurrently together in one or more data centers, are illustrated. Further, the abstraction layer (e.g., vendor abstraction 460) may be used to reduce potential (and expected) multi-vendor complexity. Physical devices types 505 may include storage, compute servers, networking devices, and other data center devices. Interfaces and information for multi-vendor complexity 510 may include scripts, vendor supplied tools, device specific training manuals, licensing information, or other data that may be specific for different vendors. Abstraction interfaces 515 may provide the above discussed abstraction to each of these types of vendor specific information and tools.

Figure 5B:
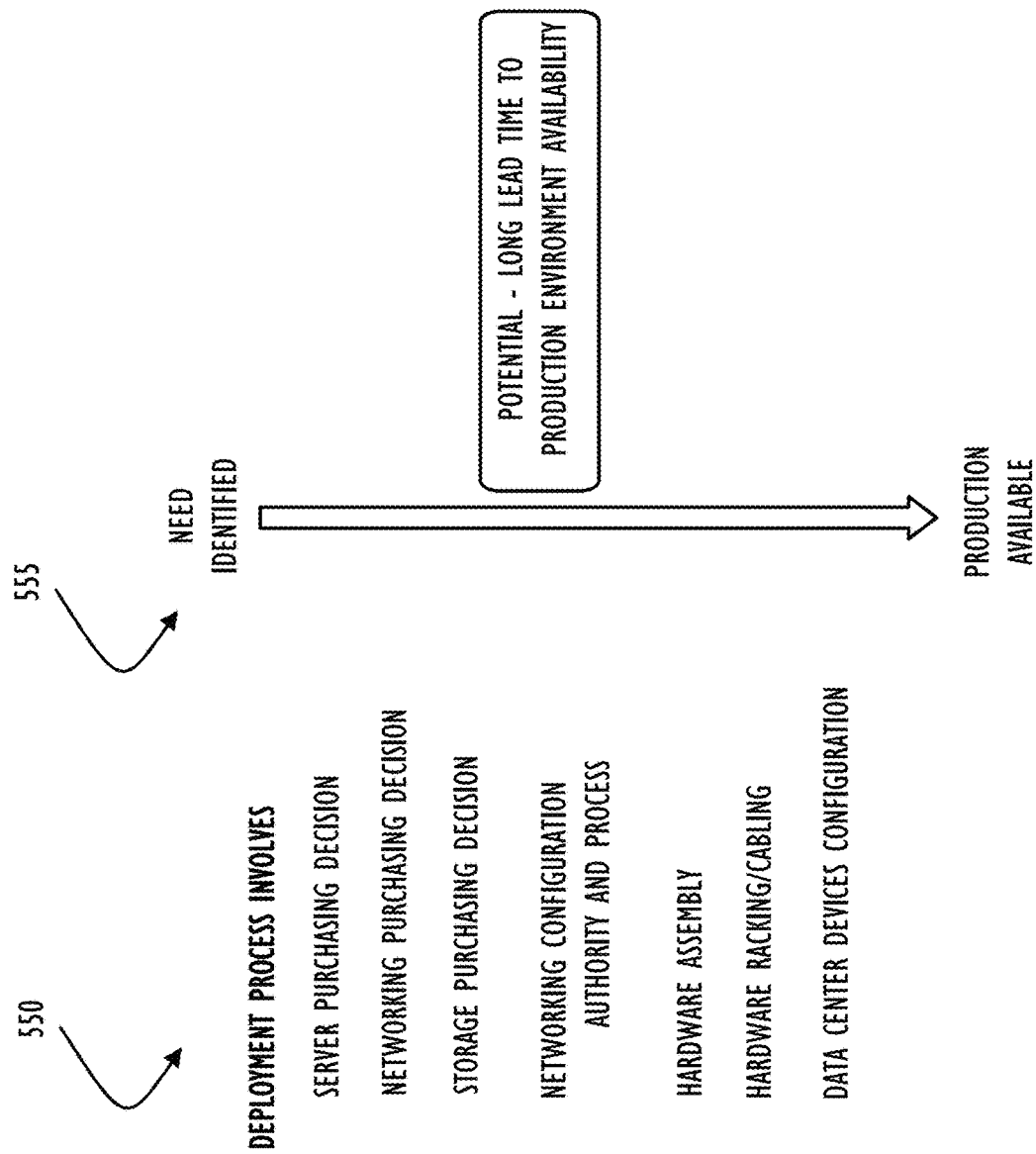
FIG. 5B illustrates an example timeline for planning and deployment of data center devices, according to one or more disclosed implementations.

Referring to FIG. 5B, an example timeline 555 for planning and deployment of data center devices is illustrated by an arrow. As mentioned above, procurement/deployment timeline 555 begins with a need being identified and completes with production availability in response to that identified need. There may be a potential long lead time from a need being identified and production availability. Timeline 555 illustrates some of the different activities (e.g., 550) that may take place during this procurement/deployment cycle and is similar to that shown for FIG. 3 as discussed above.

Figure 6:
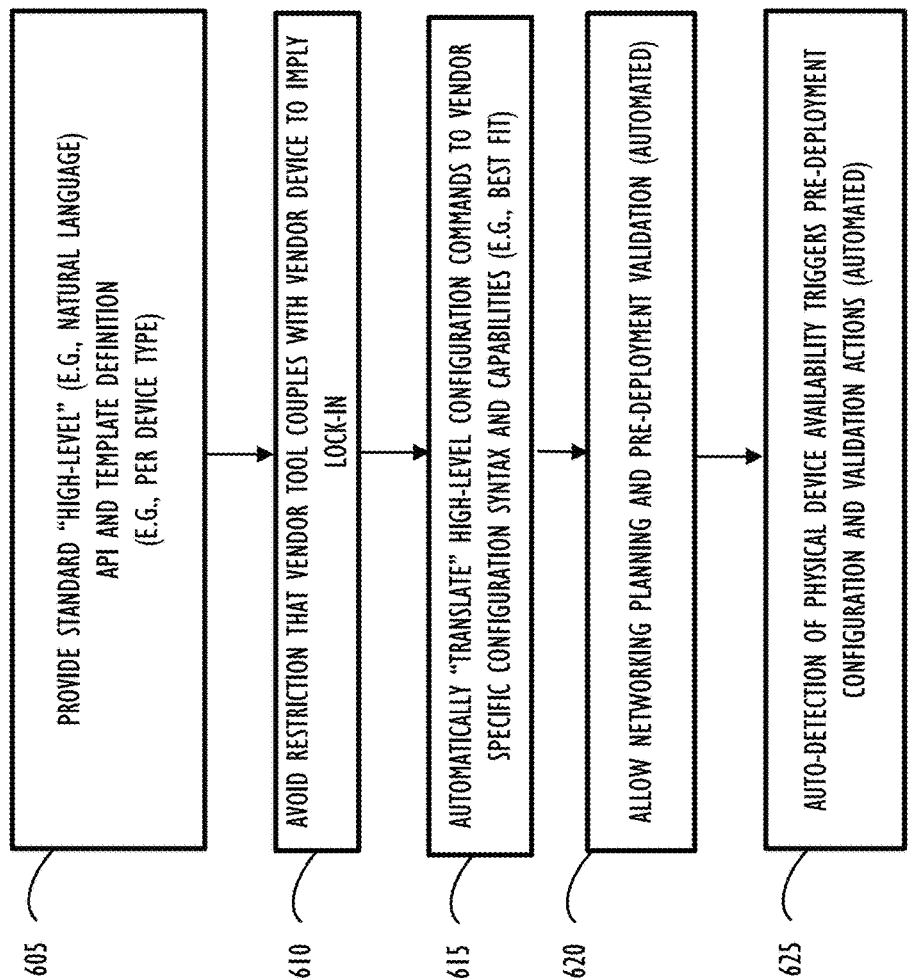
FIG. 6 illustrates one example technique for abstraction and temporal awareness with respect to a procurement/deployment process, according to one or more disclosed implementations.

FIG. 6 illustrates one example method 600 for abstraction and temporal awareness with respect to a procurement/deployment process. Block 605 indicates that a high-level interface may be provided (e.g., via management station 405) to allow, for example, natural language commands to be provided to devices within a data center. Block 610 indicates that this high-level interface may allow a data center operator to avoid becoming "locked-in" with a specific vendor of hardware components. This lock-in may be caused, in part, because a data center operator's infrastructure may be built around a single vendor's command interfaces. For example, they may have built their management scripts with vendor-specific commands that would require substantial rework to interface to another vendor's devices. Block 615 indicates that a high-level command may be automatically translated by one or more vendor aware modules into vendor-specific commands (e.g., the above-mentioned vendor dependent configuration commands) prior to providing those configuration commands to the actual devices. Block 620 indicates that network planning and pre-deployment validation may be automated using disclosed implementations. For example, configurations may be defined prior to actually having defined components at the data center, such that, upon detection a previously defined configuration may be applied to an already known device (e.g., by recognition of a serial number obtained from a purchasing system and associated with a configuration definition). Block 625 indicates that auto-detection of a physical device may trigger the previously defined configuration automatically upon arrival and network connection of the "already known" device. Further, these actions may be fully automated and initiated without actual system administrator intervention. Finally, it will be appreciated by those of ordinary skill in the art, given the benefit of this disclosure, that an abstraction layer may be implemented at different levels of an architecture. For example, abstraction could take place at a management station (e.g., management station 405) prior to transmission to a target device, at each target device (e.g., using an adapter module on each target device), or a combination thereof.

Figure 7:
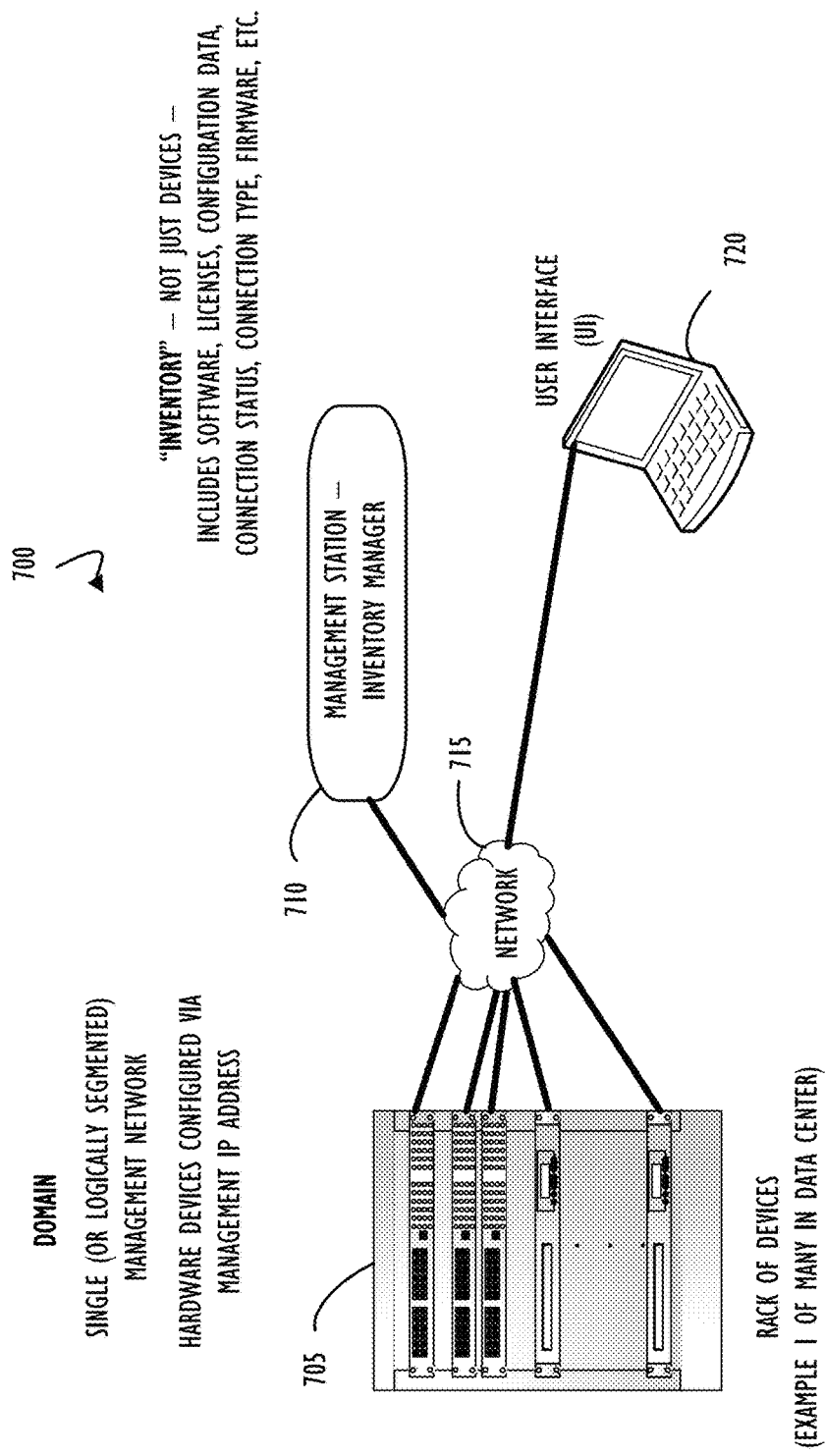
FIG. 7 illustrates an example domain of devices that may exist in a data center and their potential interface to a management station system to improve a procurement/deployment process, according to one or more disclosed embodiments

Referring now to FIG. 7, an example domain of devices 700 that may exist in a data center is illustrated. Each of these devices, within domain of devices 700, may also have a potential interface to a management station system (e.g., management station 405) to improve a procurement/deployment process according to disclosed implementations. As illustrated in domain of devices 700, different devices may be connected via communication network 715 which may be a local area network or a wide area network and may include intermediary networks such as the Internet. User device 720 may be configured to include the above-mentioned GUI to interface with a system administrator or other user to allow interaction with functionality of the disclosed system. Management station—inventory manager 710 represents an example of management station 405 discussed above. Rack of devices 705 is an example of one of potentially many racks of devices (and un-racked devices such as a mainframe) that may exist in a data center and be controlled by the disclosed domain architecture. As used in this example, a "domain" represents a single or logically segmented management network. That is, a corporate enterprise infrastructure network may be segmented into different management portions referred to as domains or may be a single large domain of management. Each of the devices within a given domain may be configured via a management Internet Protocol (IP) address that may be on a dedicated management network or may be part of a shared communication network. Domain devices may include any of the computational devices mentioned above and may include any device connected to or accessible by the management network. I will be appreciated by those of ordinary skill in the art, given the benefit of this disclosure, that domain devices may include any device expected or not expected (e.g., rouge device) to be connected to the management network. In this manner, detection of an unexpected device may allow a management station to alert as to the existence of an unexpected device (e.g., that may represent a configuration error or potentially malicious device). Thus, security of a corporate infrastructure network may be enhanced using the techniques of this disclosure. Finally, as also mentioned above, inventory is not intended to be limited to hardware devices, as software, licensing information, metrics, and firmware may also be included in information provided to and processed by a management station—inventory manager 710. In some implementations, inventory manager 710 may maintain information about a set of current configuration attributes and current parameter settings for each of a plurality of computer devices communicatively coupled to a configuration management system. In this manner, the configuration management system and inventory manager 710 may function together to monitor, maintain, and implement changes to infrastructure for addressing capacity planning and reducing a time delay to production for future devices. In short, future devices may be managed in coordination with existing infrastructure.

Figure 8:
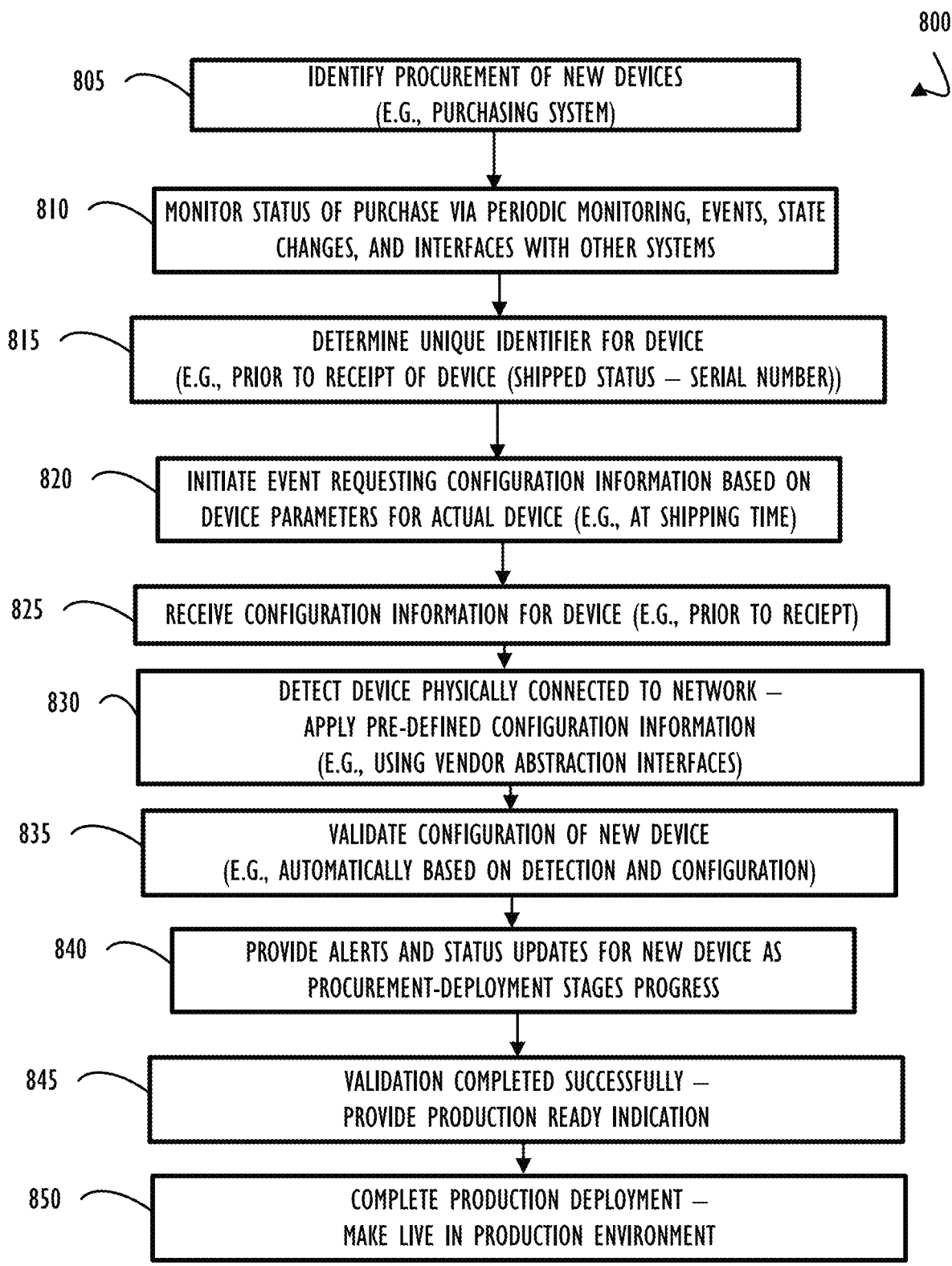
FIG. 8 illustrates one example method for automating and improving system administrator interactions with respect to a procurement/deployment system, according to one or more disclosed embodiments.

Referring now to FIG. 8, a flow chart illustrates one example method 800 for automating and improving system administrator interactions with respect to a procurement/deployment system. The example illustrates one potential flow for automating and enhancing a procurement/deployment process. It is to be understood that the flow chart in this example could be altered by different implementations of this disclosure to introduce parallelism at different points of the example method 800.

In accordance with this example, block 805 illustrates that an identification of procurement of new devices may initiate method 800. For example, based on an entry into a purchasing system, a management station (e.g., management station 405) may receive an indication that new management components are going to arrive at a future date for a data center. Block 810 indicates that monitoring of the status of the purchase request may take place and information may be gathered (e.g., serial numbers, device specifications) as the procurement process evolves to actual delivery. Also, the target environment (e.g., the data center environment or corporate enterprise network) may undergo changes in configuration while the procurement process is taking place. These changes may impact exactly how to configure the newly ordered equipment when it arrives and is to be integrated into a production environment. As part of the monitoring at block 810, block 815 indicates that a unique identifier (e.g., serial number) may be determined for the device that is scheduled to arrive in the future. Block 820 indicates that once a unique identifier is available a complete configuration may be possible, and an event may be generated to a system administrator, for example, to provide specific configuration information based on the defined parameters of the actual device. It is understood that even the same device (e.g., another instance of a device already installed in a data center) ordered from a manufacturer may arrive with different firmware versions or other attributes as vendors continuously alter internals of devices over time. Thus, this different internal specification information may be identified and accounted for using information available in a BOM or other documentation obtained during the manufacturing/shipping process.

Block 825 indicates that a system administrator, for example, may provide detailed configuration information prior to arrival of any new devices or components. Block 830 indicates that an automatic detection of a device to a management network may take place and responsive to that detection, the already provided configuration may be automatically applied. Application of the configuration may utilize the above-mentioned vendor abstraction capability. Block 835 indicates that automatic validation actions may automatically be initiated after initial configuration is complete. For example, existing test scripts may be executed to validate that the newly configured device functions within the target environment as expected. Block 840 indicates that alerts and status updates may be initiated at this point (and at other points) in the process to inform system administrators and other users of the progress of this particular procurement/deployment activity. Block 845 indicates that, upon successful validation, a production ready indication for the newly configured equipment may be initiated. Finally, block 850 indicates that the procurement/deployment activity may be completed by bringing the newly configured equipment "on-line" within the production environment.

Figure 9:
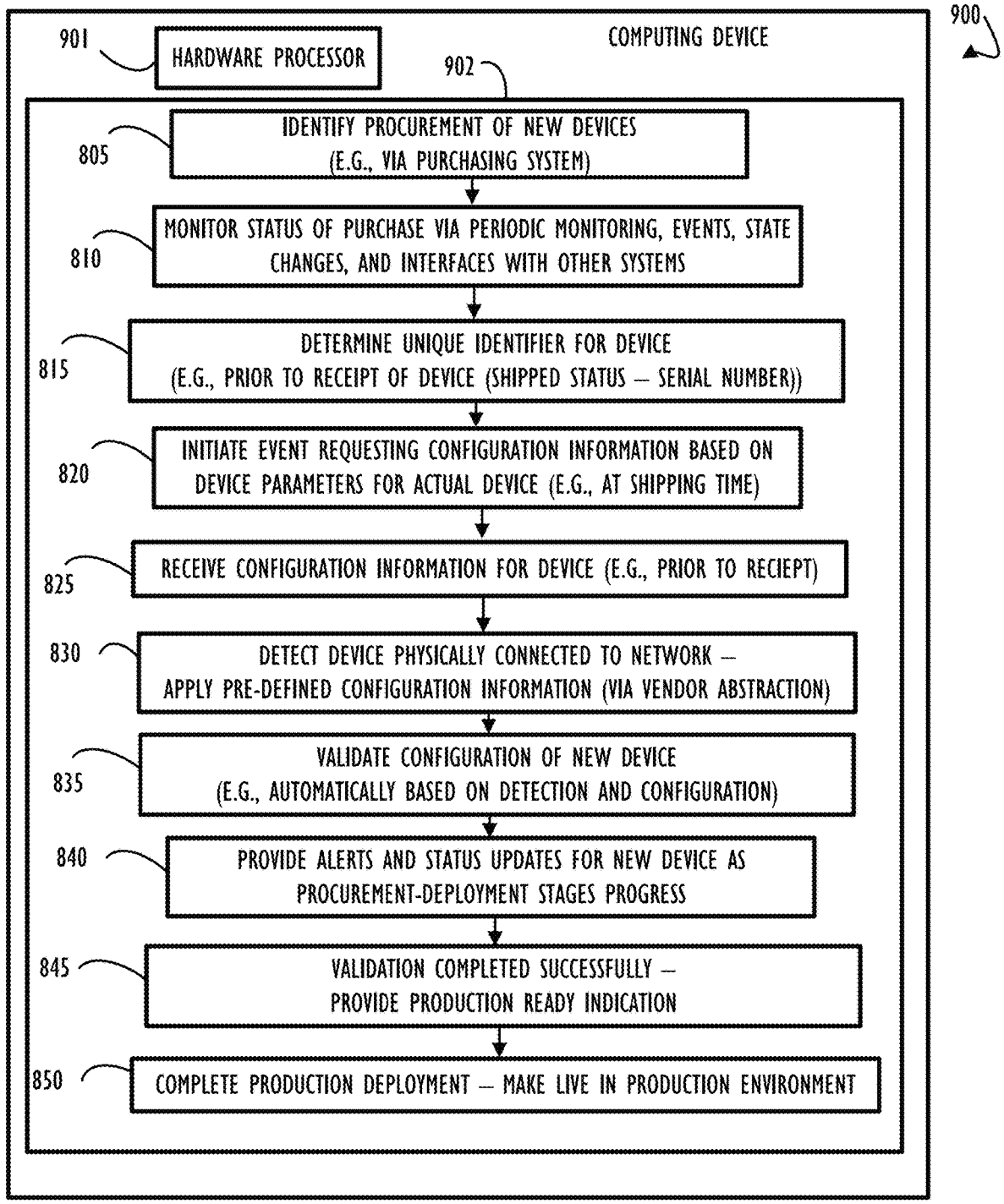
FIG. 9 illustrates an example computing device instrumented with computer instructions to perform the method of FIG. 8, according to one or more disclosed embodiments.
Figure 10:
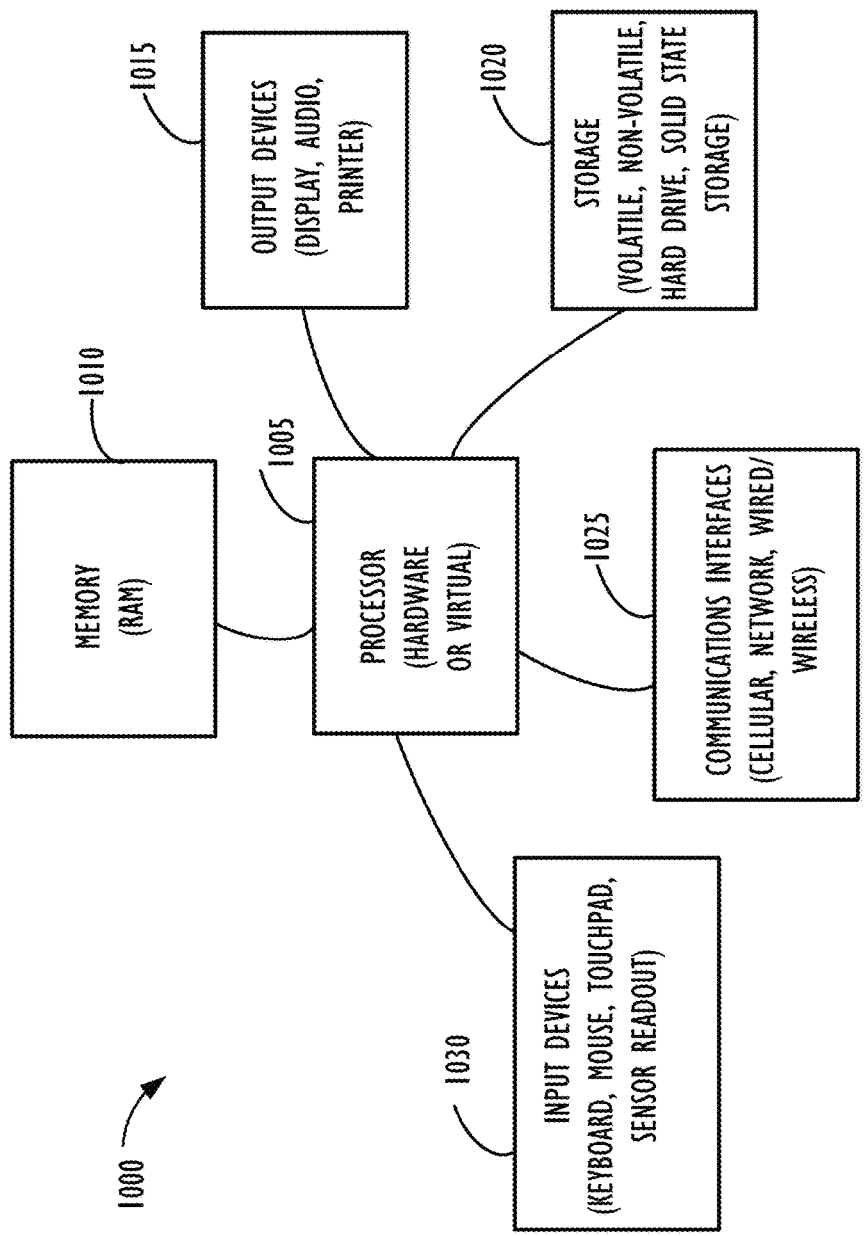
FIG. 10 illustrates a computing device that may be used to implement the functions, modules, processing platforms, execution platforms, communication devices, and other methods and processes of this disclosure.

FIG. 9 is an example computing device 900, with a hardware processor 901, and accessible machine-readable instructions stored on a machine-readable medium 902 for implementing one example temporally aware procurement/deployment system, according to one or more disclosed example implementations. FIG. 9 illustrates computing device 900 configured to perform the flow of method 800 as an example. However, computing device 900 may also be configured to perform the flow of other methods, techniques, functions, or processes described in this disclosure. In this example of FIG. 9, machine-readable storage medium 902 includes instructions to cause hardware processor 901 to perform blocks 805-850 discussed above with reference to FIG. 8.

A machine-readable storage medium, such as 902 of FIG. 9, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

FIG. 10 illustrates a computing device 1000 that may be used to implement the functions, modules, processing platforms, execution platforms, communication devices, and other methods and processes of this disclosure. For example, computing device 1000 illustrated in FIG. 10 could represent a client device or a physical server device and include either hardware or virtual processor(s) depending on the level of abstraction of the computing device. In some instances (without abstraction), computing device 1000 and its elements, as shown in FIG. 10, each relate to physical hardware. Alternatively, in some instances one, more, or all of the elements could be implemented using emulators or virtual machines as levels of abstraction. In any case, no matter how many levels of abstraction away from the physical hardware, computing device 1000 at its lowest level may be implemented on physical hardware.

As also shown in FIG. 10, computing device 1000 may include one or more input devices 1030, such as a keyboard, mouse, touchpad, or sensor readout (e.g., biometric scanner) and one or more output devices 1015, such as displays, speakers for audio, or printers. Some devices may be configured as input/output devices also (e.g., a network interface or touchscreen display).

Computing device 1000 may also include communications interfaces 1025, such as a network communication unit that could include a wired communication component and/or a wireless communications component, which may be communicatively coupled to processor 1005. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 10, computing device 1000 includes a processing element such as processor 1005 that contains one or more hardware processors, where each hardware processor may have a single or multiple processor core. In one embodiment, the processor 1005 may include at least one shared cache that stores data (e.g., computing instructions) that are utilized by one or more other components of processor 1005. For example, the shared cache may be a locally cached data stored in a memory for faster access by components of the processing elements that make up processor 1005. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 10, the processing elements that make up processor 1005 may also include one or more of other types of hardware processing components, such as graphics processing units (GPU), application specific integrated circuits (ASICs), field-programmable gate arrays (FPGAs), and/or digital signal processors (DSPs).

FIG. 10 illustrates that memory 1010 may be operatively and communicatively coupled to processor 1005. Memory 1010 may be a non-transitory medium configured to store various types of data. For example, memory 1010 may include one or more storage devices 1020 that comprise a non-volatile storage device and/or volatile memory. Volatile memory, such as random-access memory (RAM), can be any suitable non-permanent storage device. The non-volatile storage devices 1020 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 1020 may be used to store overflow data if allocated RAM is not large enough to hold all working data. The non-volatile storage devices 1020 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 1005. In one embodiment, the compiling process of the software program may transform program code written in a programming language to another computer language such that the processor 1005 is able to execute the programming code. For example, the compiling process of the software program may generate an executable program that provides encoded instructions (e.g., machine code instructions) for processor 1005 to accomplish specific, non-generic, particular computing functions.

After the compiling process, the encoded instructions may then be loaded as computer executable instructions or process steps to processor 1005 from storage device 1020, from memory 1010, and/or embedded within processor 1005 (e.g., via a cache or on-board ROM). Processor 1005 may be configured to execute the stored instructions or process steps in order to perform instructions or process steps to transform the computing device into a non-generic, particular, specially programmed machine or apparatus. Stored data, e.g., data stored by a storage device 1020, may be accessed by processor 1005 during the execution of computer executable instructions or process steps to instruct one or more components within the computing device 1000.

A user interface (e.g., output devices 1015 and input devices 1030) can include a display, positional input device (such as a mouse, touchpad, touchscreen, or the like), keyboard, or other forms of user input and output devices. The user interface components may be communicatively coupled to processor 1005. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 1000 may comprise other components well known in the art, such as sensors, powers sources, and/or analog-to-digital converters, not explicitly shown in FIG. 10.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A computer-implemented method for providing configuration management functionality for a system of networked computer devices, the method comprising:
  maintaining information about a set of current configuration attributes and current parameter settings for each of a plurality of devices communicatively coupled to a configuration management system;
  in response to determining that a purchase request for a first switch to-be purchased has been entered, defining a configuration policy based on the purchase request for the device;
  in response to receiving additional information about the first switch from a first vendor, defining an entry in the configuration management system representative of the first switch based on a unique identifier present in the information from the purchasing system, wherein the plurality of devices include a second switch from a second vendor;
  identifying the configuration policy to apply to the first switch, wherein the configuration policy includes a set of configuration attributes and parameter settings to be applied to the first switch after the first switch is communicatively coupled to the configuration management system;
  receiving an indication that the first switch has become communicatively coupled to the configuration management system; and
  automatically applying a configuration based on the configuration policy by translating attributes defined in high-level configuration information, using a vendor abstraction translation mechanism, to vendor dependent configuration commands to facilitate consistent functionality related to the high-level configuration information to the first and second switches.

2. The computer-implemented method of claim 1, wherein the first vendor and the second vendor are two different hardware vendors of switches.

3. The computer-implemented method of claim 2, wherein the first switch and the second switch have different vendor dependent commands derived using the high-level configuration information.

4. The computer-implemented method of claim 1, wherein the unique identifier present in the information from the purchasing system is a vendor's serial number for the first switch.

5. The computer-implemented method of claim 1, wherein the information from the purchasing system includes information about optional attributes of the first switch, wherein the optional attributes indicates options purchased in addition to a base configuration of the first switch.

6. The computer-implemented method of claim 1, wherein the configuration policy defines information about configuration of hardware, software, and network communication parameters.

7. The computer-implemented method of claim 1, wherein the information from the purchasing system includes information about:
  a data center to receive the first switch, and
  attributes of the first switch, wherein the attributes of the first switch are different from an existing device, from the plurality of computer devices, in the data center, and wherein the first switch and the existing device are associated with a consistent model number from a same vendor.

8. The computer-implemented method of claim 1, wherein the configuration policy is identified based on information received via a console interface.

9. A non-transitory computer readable medium comprising computer executable instructions that, when executed by one or more processing units, cause the one or more processing units to:

maintain information about a set of current configuration attributes and current parameter settings for each of a plurality of devices communicatively coupled to a configuration management system;

in response to determining that a purchase request for a first switch to-be purchased has been entered, define a configuration policy based on the purchase request for the first switch;

in response to receiving additional information about the first switch from a first vendor, define an entry in the configuration management system representative of the first switch based on a unique identifier present in the information from the purchasing system, wherein the plurality of devices include a second switch from a second vendor;

identify a configuration policy to apply to the first switch, wherein the configuration policy includes a set of configuration attributes and parameter settings to be applied to the first switch after the first switch is communicatively coupled to the configuration management system;

receive an indication that the first switch has become communicatively coupled to the configuration management system; and automatically apply a configuration based on the configuration policy by translating attributes defined in high-level configuration information, using a vendor abstraction translation mechanism, to vendor dependent configuration commands to facilitate consistent functionality related to the high-level configuration information to the first and second switches.

10. The non-transitory computer readable medium of claim 9, wherein the first vendor and the second vendor are two different hardware vendors of switches.

11. The non-transitory computer readable medium of claim 10, wherein the first switch and the second switch have different vendor dependent commands derived using the high-level configuration information.

12. The non-transitory computer readable medium of claim 9, wherein the unique identifier present in the information from the purchasing system is a vendor's serial number for the first switch.

13. The non-transitory computer readable medium of claim 9, wherein the information from the purchasing system includes information about optional attributes of the first switch, wherein the optional attributes indicates options purchased in addition to a base configuration of the first switch.

14. The non-transitory computer readable medium of claim 9, wherein the configuration policy defines information about configuration of hardware, software, and network communication parameters.

15. The non-transitory computer readable medium of claim 9, wherein the information from the purchasing system includes information about:

a data center to receive the first switch, and attributes of the first switch, wherein the attributes of the first switch are different from an existing device, from the plurality of devices, in the data center, and wherein the first switch and the existing device are associated with a consistent model number from a same vendor.

16. The non-transitory computer readable medium of claim 9, wherein the configuration policy is identified based on information received via a console interface.

17. A computer device comprising:

a network interface to connected to a network;

a processing device communicatively coupled to the network interface; and a memory storing instructions, that when executed by the processing device, cause the computer device to:

maintain information about a set of current configuration attributes and current parameter settings for each of a plurality of devices communicatively coupled to a configuration management system;

in response to determining that a purchase request for a first switch to-be purchased has been entered, define a configuration policy based on the purchase request for the first switch;

in response to receiving additional information about the first switch from a first vendor, define an entry in the configuration management system representative of the first switch based on a unique identifier present in the information from the purchasing system, wherein the plurality of devices include a second switch from a second vendor;

identify a configuration policy to apply to the first switch, wherein the configuration policy includes a set of configuration attributes and parameter settings to be applied to the first switch after the first switch is communicatively coupled to the configuration management system;

receive an indication that the first switch has become communicatively coupled to the configuration management system; and automatically apply a configuration based on the configuration policy by translating attributes defined in high-level configuration information, using a vendor abstraction translation mechanism, to vendor dependent configuration commands to facilitate consistent functionality related to the high-level configuration information to the first and second switches.

18. The computer device of claim 17, wherein the configuration policy is identified based on information received via a console interface.

19. The computer device of claim 18, wherein the first switch and the second switch have different vendor dependent commands derived using the high-level configuration information.

20. The computer device of claim 18, wherein the console interface is remotely available and communicates with the computer device via the network interface.

* * * * *